Dec. 27, 1966  A. CAUVIN  3,294,191
REAR-AXLE SUSPENSION SYSTEM
Filed Oct. 12, 1964
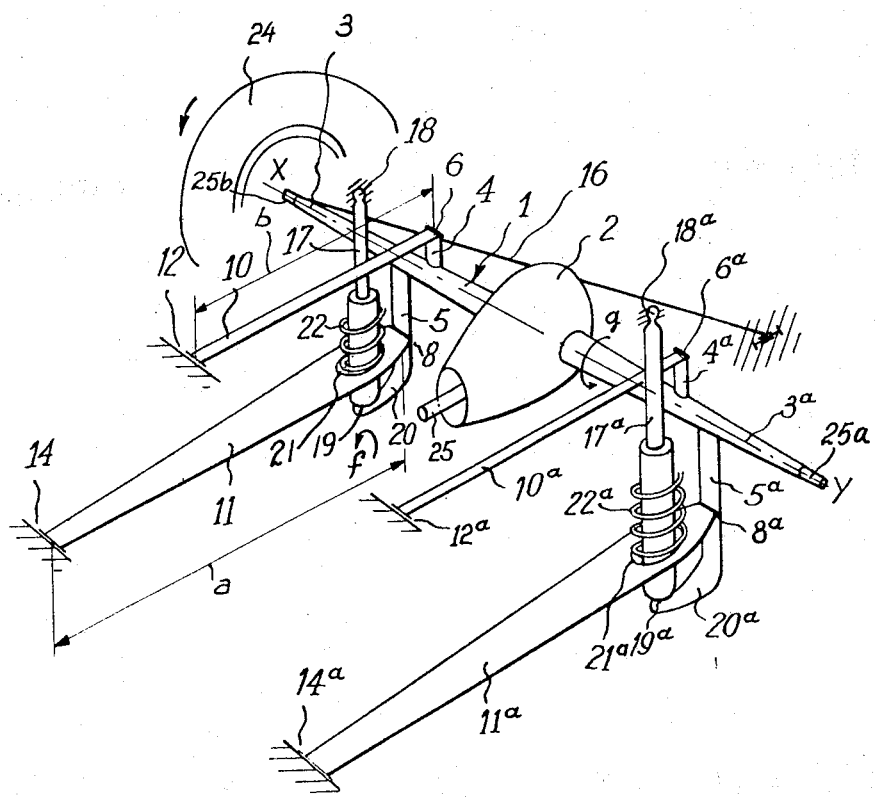
Inventor
André Cauvin
By Stevens, Davis, Miller & Mosher
Attorneys

United States Patent Office 3,294,191
Patented Dec. 27, 1966

---

3,294,191
REAR-AXLE SUSPENSION SYSTEM
André Cauvin, Port-Marly, France, assignor to Société
Anonyme dite: Simca Automobiles, Paris, France
Filed Oct. 12, 1964, Ser. No. 403,064
Claims priority, application France, Oct. 28, 1963,
951,945
4 Claims. (Cl. 180—73)

This invention relates to rear-axle suspension systems for motor vehicles, more especially vehicles including rear axle assemblies of the type sometimes referred to as "banjo" axles.

Rear axle assemblies of this type are frequently supported for generally vertical movement relative to the frame of the vehicle by way of generally parallel, upper and lower links which have their rear ends pivoted to the ends of upward and downward arms, respectively, projecting from the axle housings of the rear-axle assembly, and their forward ends attached, as through rubber supporting blocks, to suitable points of the frame.

To damp such generally vertical relative movement between the rear axle and vehicle frame, shock absorbers are provided, having their upper ends attached to the frame and their lower ends attached to the rear-axle assembly. Further, helical suspension springs are frequently associated with the shock absorber units. The lower ends of the shock absorber units have generally been attached directly to the axle housings, or sometimes to the lower ones of the aforementioned links serving to mount the rear axle for vertical movement relative to the frame.

It has been found that rear axle assemblies of this type, in addition to their normal, generally vertical, reciprocatory movements relative to the frame as permitted by the afore-mentioned linkage arrangement, sometimes also tend to assume limited angular reciprocatory movement in rotation about the common axis of the wheel axles. These angular movements tend to occur primarily whenever there is a relatively sudden change in the engine torque applied to the input gear of the differential gearing housed within the rear axle assembly. Thus, assuming a sudden increase in applied torque due to acceleration, such sudden increase in the torque applied from the input pinion to the input gear of the differential may tend to cause the differential gearing and with it the whole rear axle to dip slightly around the common axis of the differential output gears and the wheel axle shafts. These rotational displacements of the rear axle, however limited in angular extent, create vibrations and noise and interfere with the proper functioning both of the torque transmission means and the suspension.

It is an object of this invention to provide an improved rear-axle suspension system which will overcome or reduce the above defect and thereby considerably enhance the performance of the motor vehicle, while only requiring simple and easily effected departures from standard construction of the relevant components of the vehicle.

In accordance with a chief aspect of the invention, the shock absorbers are connected to the rear axle housings at points positioned on a vertical transverse plane horizontally displaced a substantial distance longitudinally from the vertical plane through the common axis of the differential output gears and axle shafts.

Due to this arrangement, the shock absorber units in addition to their conventional function of damping the generally vertical movements of the rear axle relative to the vehicle frame, will simultaneously serve to damp the above-mentioned rotational movements of the rear axle about its transverse output axis owing to the leverage provided by the longitudinal displacement between the points of attachment of the shock absorbers with the axle housings, and the said transverse axis.

A further feature of the invention relates to an improved relationship between the effective lengths of the upper and lower links connecting the rear axle with the frame in a system of the type referred to earlier herein, whereby the proper homokinetic character of the drive transmission will be preserved.

The above and further features will appear from the ensuing description of an exemplary embodiment of the invention selected by way of illustration but not of limitation and with reference to the accompanying drawing, the single figure of which is a simplified isometric view of the main components of an improved rear-axle suspension system.

The drawing shows a rear-axle assembly generally designated 1 and including medially-positioned differential housings 2 and two axle housings 3 and 3a, projecting from opposite sides of housings 2. It will be understood that the differential housings 2 contains a conventional differential gearing, not shown, which may be any usual type, and including an input gear and differential output gears. A transmission shaft 25 has its forward end connected to a conventional engine-and-transmission system, not shown, while its rear end projects into the differential housing 2 there to drive an input gears of the differential by means of a pinion, not shown, carried on the rear end of shaft 25 inside the housing 2. It will likewise be evident that the axle housings 3 and 3a, contain respective axle shafts 25a and 25b rotatable therein. The inboard ends of the axle shafts being connected to the output gears of the differential while the outboard ends of the axle shafts are connected to the rear wheels of the motor vehicle, one of which is shown at 24.

A pair of generally vertical upper arms 4 and 4a project upward from intermediate points of the respective axle housings 3 and 3a, those arms being symmetrically positioned on opposite sides from the differential housing 2. Connected to the free ends of upper arms 4, 4a by way of pivotal connections 6 and 6a are the rear ends of respective upper links 10 and 10a, the forward ends of which are pivotally connected as at 12 and 12a to suitable parts of the frame or body of the vehicle, as through rubber supporting blocks or the like.

A pair of lower arms 5 and 5a project downward from the axle housings 3, 3a at points symmetrically positioned on opposite sides from the differential housing 2, and as here shown positioned laterally outboard with respect to the upper arms 4, 4a. Pivoted at 8 and 8a to the lower arms 5, 5a are the rear ends of respective lower links 11, 11a, somewhat longer than the upper links 10, 10a and having their forward ends attached at 14 and 14a, to the frame or body structure of the vehicle as through rubber supporting blocks or the like.

As an optional feature, a lateral stabilizer bar, sometimes known as a De Dion bar, is shown at 16 as having one end attached to the outboard end of axle housing 3 and its opposite end attached to a suitable point of the frame near the opposite side of the vehicle.

In accordance with the invention, in the illustrated embodiment, the lower arms 5 and 5a are extended downward beyond the points 8 and 8a at which the links 11 and 11a are pivoted thereto, and the lower extensions 20 and 20a of said arms are curved or angled in a forward direction, as shown, so that the free lower ends of the arm extensions 20 and 20a are spaced a substantial horizontal distance forwardly from the axis XY, which is the common geometric axis of the output gears of the differential gearing and the axle shafts of the wheels 24.

A pair of shock absorber units 17 and 17a are provided, and have their upper ends 18 and 18a pivotally connected, as through ball and socket joints, to suitable parts of the car body or frame structure in the conventional manner. In accordance with this invention, the lower ends of the shock absorber units 17 and 17a, are connected, as through ball and socket joints, to the forwardly displaced lower ends 19 and 19a of the lower arm extensions 20 and 20a. It will be noted that in the illustrated construction the shock absorbers 17 and 17a are shown as extending freely through apertures 21 and 21a formed in the lower links 11 and 11a. Helical suspension springs 22 and 22a are further shown as being coiled around the shock absorber units 17 and 17a and as having their lower ends abutted against the upper surfaces of the lower links 11 and 11a while the upper ends of the coil springs may be abutted against any suitable parts of the car frame or body.

It will be recognized that the rear-axle suspension system thus described and illustrated is to a large extent conventional but that it shows an essential difference over conventional systems in the manner the lower end of the shock absorber units is connected to the rear-axle assembly. The significance of this difference will presently appear.

In the operation of the suspension system, the shock absorbers 17 and 17a operate the usual way to damp the vertical movements of the rear-axle assembly 1 relative to the car frame. During such movements, the upper and lower links 10 and 11 swing vertically about their forward end pivots 12–12a and 14–14a, relative to the frame, and the rear-axle assembly 1 including the differential housing 2 and axle housings 3, 3a reciprocates in a substantially vertical plane relative to the frame. These vertical reciprocatory movements of the rear-axle assembly are damped by the action of the shock absorbers 17 and 17a because the lower ends of these latter are connected to the lower arms 5, 5a rigid with the rear axle housings 3 while their upper ends are connected at 18, 18a to the car frame, the shock absorbers cooperating in the usual manner with the suspension coil springs 22, 22a.

It has been found that in motor vehicles having rear-axle systems of the general type indicated, variations in the engine torque sometimes tend to produce bodily rotations of the rear axle about the rear wheel axis XY. More specifically, considering a sharp increase in the engine torque applied to the transmission shaft 25 in the direction of arrow f, as due to sudden acceleration, then this increase in torque applied to the differential input gear will create a tendency for the differential gears housing 2 and with it the axle housings 3, 3a to pivot bodily in the direction of arrow g about the axis XY of the differential output gears and rear wheels 24. In the past, this has given rise to small but definite rotational oscillatory motions of the rear-axle assembly 1 about its instantaneous centre of rotation with consequent noise and other objectionable effects.

In the improved suspension system described and shown, these rotational oscillations of the rear-axle about the axis XY are effectively damped out by the action of the shock absorbers 17 and 17a, due to the lever arm present between the shock absorbers and the axis XY, this lever arm in the disclosed embodiment being produced by the offset extensions 20 and 20a of the lower arms 5, 5a, whereby the point of connection 19, 19a of the lower ends of the shock absorber units 17, 17a are displaced forwardly, in the horizontal direction, from the axis XY. Due to the presence of this lever arm, a damping moment is created by the shock absorbers 17, 17a which effectively damps out any rotational oscillations that the rear axle assembly 1 would otherwise tend to assume about said axis XY.

It will thus be seen that in the suspension system of the invention, the conventional shock absorber units 17 and 17a are made to perform a dual function: in addition of their usual function of damping translational oscillations of the rear-axle assembly 1 in a vertical plane, they further serve to damp out the rotational oscillations of said assembly about the differential output axis XY, which tend it be set up whenever there occurs a sharp change in the engine torque. It will also be noted that this highly desirable additional function is obtained at the cost of a relatively simple modification in the usual geometry of the parts of the suspension system.

It has been found that best performance of the improved rear-axle suspension system is obtained when the ratio of the length ($b$) of the upper levers 10 and 10a to the length ($a$) of the lower levers 11 and 11a is less than unity, but greater than about 0.4 (i.e. $0.4 < a/b < 1$). If the lever length ratio is outside this range the amplitude of the angular motion of the rear axle unit 1 about the wheel axis XY tends to assume excessively large values and the homokinetic character of the drive transmission through the drive shaft 25 to the rear wheel axle shafts becomes impaired.

Various departures from the particular construction shown in the drawing may be made without departing from the essential teachings of the invention. Thus, the shock absorbers 17 and 17a may have their lower ends connected to the axle housings 3 and 3a by way of additional arms separate and distinct from the arms 5 and 5a which serve to connect said axle housings with the lower links 11 and 11a. Such additional arms would of course extend, or include portions thereof extending, in a generally longitudinal direction from the axle housings 3 and 3a in order to preserve the basic teaching of the invention according to which a substantial lever arm is present between the line of action of the shock absorbers and the centre axis XY of the differential output gears. In this last mentioned modification, the additional arms just mentioned may be spaced along the axle housings 3, 3a either inboard or outboard from the arms 5, 5a and in either case the shock absorber units 17, 17a would be displaced laterally from the lower links 11, 11a so that the apertures 21, 21a in the latter would be omitted.

What I claim is:

1. In a motor vehicle including a frame, rear wheels, a rear axle assembly carrying said wheels and including wheel axle housings, and differential means in said assembly having an input to which an engine torque is applied and having coaxial outputs applying said torque to said wheels; the improvement comprising a first pair of upward arms projecting upwards from said axle housings; a second pair of downward arms projecting downwards from said axle housings; a third pair of arms extending forwardly from said downward arms; a pair of upper links having rear ends pivotally connected to said upward arms and forward ends pivotally connected to said frame; a pair of lower links having rear ends pivotally connected to said downward arms and forward ends pivotally connected to said frame; the ratio of the length of said upper links to the length of the lower links being less than 1:1, but greater than approximately 0.4:1; and a pair of shock absorbers having upper ends connected to the frame and having lower ends connected to the forward ends of said third pair of arms, said third pair of arms thus acting as lever arms between the shock absorbers and the axis of said axle housings.

2. The combination defined in claim 1 wherein said lower links have apertures therein overlying the forward ends of said third pair of arms and wherein said shock absorbers extend freely through said apertues.

3. The combination defined in claim 1 further comprising helical compression springs surrounding said shock absorbers.

4. The combination defined in claim 1 further comprising helical compression springs surrounding said shock absorbers and having their upper ends engaging said frame and their lower ends engaging the upper surfaces of said lower links.

References Cited by the Examiner
UNITED STATES PATENTS

| | | |
|---|---|---|
| 2,207,465 | 7/1940 | Leighton. |
| 2,266,280 | 12/1941 | Sherman _____ 180—73 X |
| 3,204,718 | 9/1965 | Lange _____ 180—73 |

FOREIGN PATENTS

| | | |
|---|---|---|
| 1,218,533 | 5/1960 | France. |
| 1,264,540 | 5/1961 | France. |

A. HARRY LEVY, *Primary Examiner.*